UNITED STATES PATENT OFFICE.

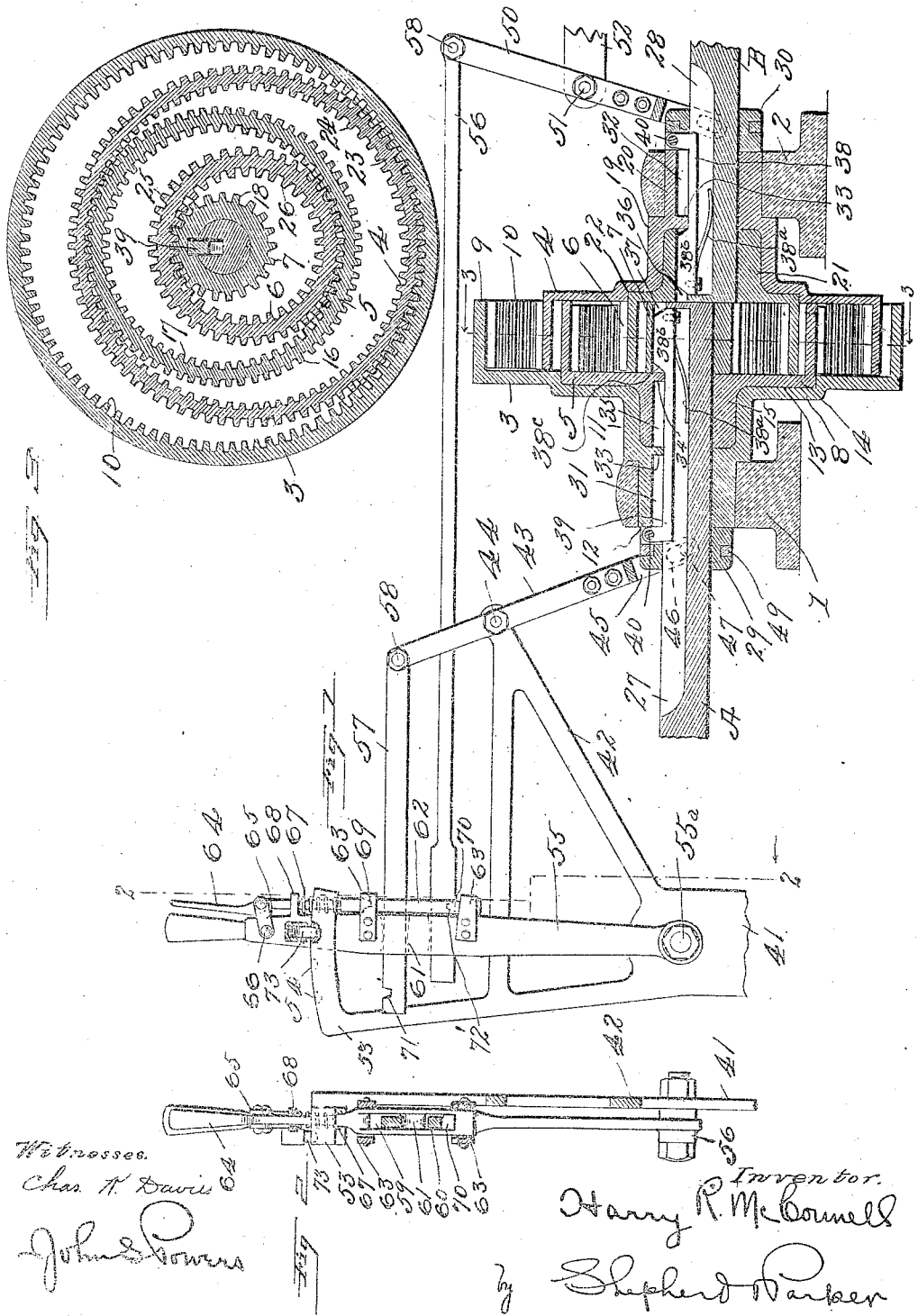

HARRY R. McCONNELL, OF WASHINGTON, DISTRICT OF COLUMBIA.

POWER-TRANSMISSION GEARING.

No. 845,314.  Specification of Letters Patent.  Patented Feb. 26, 1907.

Application filed June 20, 1906. Serial No. 322,612.

*To all whom it may concern:*

Be it known that I, HARRY R. McCONNELL, a citizen of the United States, residing at Washington, in the District of Columbia, have invented certain new and useful Improvements in Power-Transmission Gearing, of which the following is a specification.

This invention relates to new and useful improvements in power-transmission gearing, and contemplates a structure especially designed for automobile variable-speed transmissions.

The invention aims as a primary object to provide a device of the above type in which a maximum number of different speeds may be attained and in which a minimum size and degree of space for installation is afforded.

The invention aims as a further object to provide simple and inexpensive means for controlling the operative relation of the various gears embodied in the structure.

In connection with the above means it is a further object of the invention to provide a hand-lever operating in conjunction with an indicating-guide sector, whereby the particular gears in operative relation and the relative speed at which the machine is moving may be instantly ascertained.

The detailed construction will appear in the course of the following description, in which reference is had to the accompanying drawings, forming a part of this specification, like numerals designating like parts throughout the several views, wherein—

Figure 1 is a central longitudinal section of a power-transmission gearing constructed in accordance with my invention, the controlling elements thereof being shown in side elevation. Fig. 2 is an elevation of the controlling-lever, the appurtenant elements thereof being illustrated in a section taken on the line 2 2 of Fig. 1 looking in the direction of the arrow; and Fig. 3 is a central transverse section on the line 3 3 of Fig. 1.

In the practical embodiment of my invention the letter A represents the primary shaft, and the letter B represents the secondary shaft. This arrangement is to be regarded as purely arbitrary, inasmuch as the shafts may be related vice versa, according to whether a high-speed or a low-speed transmission with relation to the speed of the engine is desired. The gearing employed for transmitting the power between these shafts is of the planetary eccentric type and embodies, respectively, primary and secondary gear-wheels. The respective shafts A and B are journaled in the hubs of the respective gear-wheels, and the hub of each successively smaller gear-wheel in each series thereof is journaled in the hub of the adjacent larger gear-wheel. The outermost gears of each series are journaled in antifriction-bearings which constitute a support for the gearing as an entirety. In this relation of the various gears manually-controlled means are provided for throwing a selected gear of the primary series into operative engagement or relation with a selected gear of the secondary series, and means are provided for indicating the particular gears which are in operative relation at a given time.

The above description relates to the general construction of the apparatus as an entirety and is intended to aid in an understanding of the description of the specific elements, which now follows. The gearing embodied in the present invention is supported in antifriction-bearings 1 and 2 of approved form. Loosely mounted upon the shaft A are primary gear-wheels 3, 5, and 7, which are free to rotate upon said shaft and are coaxial therewith. Secondary gear-wheels 4 and 6 are mounted in a similar manner upon the shaft B. The shaft B is out of alinement with the shaft A, so that the axes of the respective primary gears 3, 5, and 7 and secondary gears 4 and 6 will be eccentrically disposed with relation to one another. The gear 3 is of substantial cup shape and comprises a body portion 8 in a substantially vertical plane, which carries an angularly-extending peripheral flange 9, formed on its inner face with teeth 10.

The body portion 8 is formed with a centrally-located hub 11, terminating in a reduced annular extension 12, by which said gear is journaled in the bearing 1, the shaft A being projected through and journaled in the extension 12. Said gear 3 is formed with a dished portion 13 in its inner face, within which is seated the body portion 14 of the gear 5. Said body portion is formed with a central hub 15, which interfits and is revoluble in the hub 11 of the gear 3 as a bearing. The gear 5 is formed with outer and inner peripheral teeth 16 and 17 and is of the same general conformation as the gear 3. The gear 7 is loosely mounted upon the end of the shaft A and is of the usual pinion type, being formed with teeth 18. The secondary gears 4 and 6 are of substantially the same conformation as the respective gears 3 and 5 and are mounted upon the shaft B in the same manner, the gear 4 being formed with a hub 19 and an extension 20, journaled in the bearing 2, and the gear 6 being formed with a hub 21, journaled in the hub 19 of the gear 4. In like manner the gear 4 is formed with a dished inner face 22 for the reception of the body portion of the gear 6. By virtue of this arrangement the teeth of the several gears in their eccentric relation are disposed in the same vertical plane as is indicated in Fig. 3 and by the section-line 3 3 of Fig. 1. The gears 4 and 6 are arranged in opposing or confronting relation to the primary gears and are designed to engage a selected primary gear on either side thereof. To this end the gear 4 is formed with outer and inner peripheral teeth 23 and 24 and the gear 6 with similarly-arranged teeth 25 and 26.

The shaft A is formed with an elongated keyway 27, and the shaft B is formed with a keyway 28. Splined upon said shafts are collars 29 and 30, which have a sliding adjustment upon said shafts and are rotatable therewith. The gears 3 and 4 are provided in their extensions 12 and 20 with longitudinal arcuate recesses 31 and 32 and forwardly of said recesses with an inwardly-extending flange 33. In like manner the gears 5 and 6 are formed with similarly-constructed recesses 35 and 36, the gear 6 being formed adjacent the recess 35 with a flange 34. The gear 7 is formed with a recess 37, extending therethrough. The various recesses above set forth coact with the adjacent keyways 27 and 28 in registering relation to form pockets for the reception of adjustably-positioned keys, which are employed in each series of primary and secondary gears to throw any selected pair of said gears into operative relation in accordance with the relative degree of speed desired. To this end a key 38 is carried by the collar 30 and a key 39 is carried by the collar 29. The keys 38 and 39 are proportioned in accordance with the number of gears with relation to which they have adjustment, but are counterparts in construction. Each of said keys is of substantial L shape, carrying upon its longer leg a leaf-spring 38ª, which bears in the adjacent keyway 27 or 28, and being pivoted at the end of its shorter vertical leg, as at 40, to the adjacent collar, by which said keys are respectively carried and adjusted. Said keys each terminate in enlarged heads 38ᵇ, designed for operative engagement with the several recesses in the gears, and the heads 38ᵇ are provided with inclined end faces 38ᶜ, designed to ride over the flanges 33 and 34 in the adjustable movement of said keys.

For effecting an adjustment of the keys 38 and 39 a novel mechanical arrangement of elements is provided, comprising a supporting-bracket 41, provided with a horizontal elongated arm 42. A lever 43 is fulcrumed in its upper portion, as at 44, to the arm 42, said lever being provided with a bifurcated lower end 45. The furcations of the end 45 are severally formed with short-length vertical slots 46, within which are loosely received pins 48, carried by an annulus 49, loosely mounted within a recess in the collar 29. In like manner the lever 50 is fulcrumed in its lower portion, as at 51, to a stationary supporting-arm 52 and has connection with the collar 30. Owing to the fact that the lever 43 is fulcrumed in its upper portion, its pivotal movement will be multiplied, so as to compensate for the greater line of adjustment required by the key 39. The bracket 41 carries at its upper end an arc-sector 53, provided with an alined series of depressions 54. A hand-lever 55 is fulcrumed upon the bracket 41, as at 55ª, and carries an element which coacts with elements carried by the levers 43 and 50 in effecting a pivotal movement of said levers. The lever 43 is provided with an arm 57, and the lever 50 is provided with an elongated arm 56, the arms 57 and 56 being fulcrumed to the upper end of the levers 43 and 50, as at 58. The lever 55 is formed in its body portion with openings 59 and 60 extending therethrough and separated by an integral spacing-bar 61, said openings being for the individual reception of the respective arms 57 and 56. The lever 55 carries a sliding pawl 62, movable in guide-brackets 63 and designed to be raised by a cam-handle 64. The handle 64 and the pawl 62 are fulcrumed to the ends of links 65, which are in turn pivoted, as at 66, to the lever 55. Pawl 62 is normally held downward by means of an expansive coil-spring 67, having its one end secured to said pawl and its other end bearing against an apertured lug 68 upon the lever 55, and through which said pawl projects. The pawl 62 is provided with upper and lower confronting teeth 69 and 70, designed to engage correspondingly-arranged recesses 71 and 72 in the arms 57 and 56. Mounted adjacent to the handle of the lever 55 is a spring-pressed button 73, designed to yieldably engage in the depressions 54 and to hold said lever at a selected depression until the lever is moved in either direction by the operator.

In operation when any selected pair of primary gears are in working relation the remaining gears of each series will of course be engaged with the adjacent gears, but will be running idle. As shown in Fig. 1, the gears 6 and 7 are operatively engaged with relation to the shafts A and B. This operative engagement is controlled by the position of the keys 38 and 39, and in the disclosure the key 38 is engaged in the recess 36 of the gear 6, and the key 39 is engaged in the recess 37 of the gear 7. It will be readily apparent from the disclosure in Fig. 3 that the medial gears are eccentrically disposed to the gears on each side thereof and will engage or mesh with said gears at opposite points. In the number of gears employed six speed variations are afforded—three high-speed variations in the engagement of the key 39 with the several primary gears when the key 38 is engaged with the gear 6 and three low-speed variations in like manner when the key 38 is engaged with the gear 4. In effecting an adjustment of the keys the arms 57 and 56 are reciprocated independently in the desired direction to swing the levers 43 and 50, and thus move the respective collars 29 and 30 and the keys carried thereby. In Fig. 1 the pawl 62 is disclosed as raised by the cam 64 against the tension of the spring 67. In this position of the pawl the tooth 70 will engage the recess 72. In the forward position of the lever 55, as shown, the pawl 62 being in engagement with the arm 56, the key 38 will engage the gear 6. When said lever is moved rearwardly to the last depression 54, the key 38 will engage the pinion 4. When the pawl 62 is released, the spring 67 will force the same downwardly, and the tooth 69 will engage in the recess 71 after the lever 55 has been moved adjacent to said recess. In the rearmost position of the lever, the pawl 62 being engaged with the arm 57, the key 39 will engage the pinion 7. A movement of the lever to the central depression 54 engages the key 39 with the pinion 5, and a movement of the lever to the most forward depression engages the key 39 with the gear 3. The relative degree of speed at which the machine is moving can be instantly ascertained by noting with which of the arms 57 and 56 the pawl 62 is operatively engaged and the position of the keys in such engagement by noting the positions of the recesses 71 and 72 with relation to the depressions 54. If desired, suitable indicating signs or marks can be applied to the sector 53 to facilitate the reading of the positions of the keys in the manner above set forth. It is readily apparent from the foregoing description that the number of gears may be increased or decreased at will in accordance with the number of speed variations desired, but that it is essential to preserve the arrangement of such gears.

While the elements herein shown and described are well adapted to serve the functions set forth, it is obvious that various minor changes may be made in the proportions, shape, and arrangement of the several parts without departing from the spirit and scope of the invention as defined in the appended claims.

Having fully described my invention, I claim—

1. A variable-speed gearing comprising primary and secondary non-alined shafts and operative connections therebetween comprising a plurality of graduated gears carried by said primary shaft, a plurality of graduated gears carried by said secondary shaft, each of said gears being in mesh with the gears of the opposing series on each side thereof, whereby both series of gears as an entirety are in constant intermeshing engagement, and means for operatively engaging said shafts with a selected one of said respective gears.

2. A variable-speed gearing comprising primary and secondary non-alined shafts and operative connections therebetween comprising toothed wheels carried in spaced concentric series by each of said shafts and eccentrically disposed but in intermeshing engagement with the adjacent wheels on either side thereof and means for operatively engaging said shafts with a selected one of said respective gears.

3. A variable-speed gearing comprising primary and secondary non-alined shafts and operative connections therebetween comprising toothed wheels carried in spaced concentric series by each of said shafts and eccentrically disposed but in intermeshing engagement with the adjacent wheels on either side thereof, said shafts being provided with longitudinal recesses and said toothed wheels being severally provided with recesses registering with said first-named recesses and means for operatively engaging said shafts with a selected one of said respective gears embodying keys slidable in said longitudinal recesses and manually-controlled means for sliding said keys.

4. The combination with a primary and secondary shaft, intermeshing gear-wheels interposed therebetween and carried thereby and slidable connections for establishing an operative relation between either one of said shafts and a selected respective gear carried thereby, of means for imparting sliding movement to said connections comprising a main operating-lever, arms loosely supported thereby, stationarily-pivoted levers having at their ends pivotal connection with the adjacent ones of said arms and said slidable connections and means for engaging said main lever with either of said arms at selected points thereon.

In testimony whereof I affix my signature in presence of two witnesses.

HARRY R. McCONNELL.

Witnesses:
J. W. McCONNELL,
J. J. McLEAN.